United States Patent
Houssaye

(10) Patent No.: US 9,302,775 B2
(45) Date of Patent: Apr. 5, 2016

(54) METHOD AND ARCHITECTURE FOR RECOVERY OF ENERGY IN AN AIRCRAFT

(71) Applicant: TURBOMECA, Bordes (FR)

(72) Inventor: Laurent Houssaye, Saint Faust (FR)

(73) Assignee: TURBOMECA, Bordes (FR)

( * ) Notice: Subject to any disclaimer, the term of this patent is extended or adjusted under 35 U.S.C. 154(b) by 80 days.

(21) Appl. No.: 14/353,570

(22) PCT Filed: Nov. 9, 2012

(86) PCT No.: PCT/FR2012/052585
§ 371 (c)(1),
(2) Date: Apr. 23, 2014

(87) PCT Pub. No.: WO2013/072603
PCT Pub. Date: May 23, 2013

(65) Prior Publication Data
US 2014/0290287 A1 Oct. 2, 2014

(30) Foreign Application Priority Data

Nov. 17, 2011 (FR) ..................... 11 60471

(51) Int. Cl.
*B64C 13/06* (2006.01)
*B64D 13/06* (2006.01)
*B64D 41/00* (2006.01)

(52) U.S. Cl.
CPC ............... *B64D 13/06* (2013.01); *B64D 41/00* (2013.01); *B64D 2013/0611* (2013.01); *B64D 2013/0648* (2013.01); *Y02T 50/53* (2013.01); *Y02T 50/56* (2013.01)

(58) Field of Classification Search
CPC ........... B64D 13/06; B64D 2013/0611; B64D 2013/0648; B64D 2013/0688
See application file for complete search history.

(56) References Cited

U.S. PATENT DOCUMENTS

| 2,777,301 | A | | 1/1957 | Kuhn | |
|---|---|---|---|---|---|
| 4,419,926 | A | | 12/1983 | Cronin et al. | |
| 4,503,666 | A | * | 3/1985 | Christoff | B64D 13/06 60/39.183 |
| 6,283,410 | B1 | * | 9/2001 | Thompson | B64D 41/00 244/59 |
| 6,796,131 | B2 | * | 9/2004 | Sampson | B64D 13/06 244/118.5 |
| 2004/0051002 | A1 | * | 3/2004 | Sampson | B64D 13/06 244/118.5 |
| 2010/0323601 | A1 | * | 12/2010 | Cremers | B64D 13/06 454/76 |

OTHER PUBLICATIONS

International Search Report issued Jan. 9, 2013, in PCT/FR12/052585, filed Nov. 9, 2012.

* cited by examiner

*Primary Examiner* — Joseph W Sanderson
(74) *Attorney, Agent, or Firm* — Oblon, McClelland, Maier & Neustadt, L.L.P.

(57) ABSTRACT

A method and architecture for recovery of energy in an aircraft, both at altitude and on the ground, and recovering thermal energy from an exhaust. An architecture for recovery of energy includes an auxiliary power unit APU including an exhaust nozzle and a gas generator including a shaft transmitting power to a load compressor. The compressor supplies compressed air via a supply duct to an ECS air conditioning system of a passenger cabin. A recovery turbocharger is connected, directly or via a transmission case, to the shaft of the APU. The turbocharger includes a recovery turbine powered by a downstream branch of a conduit mounted on a heat exchanger fitted to the nozzle. The conduit includes an upstream branch connected to channels connecting air outlets of the cabin and the compressor. A second exchanger can be mounted between the supply duct and the cabin outlet channel.

10 Claims, 4 Drawing Sheets

METHOD AND ARCHITECTURE FOR RECOVERY OF ENERGY IN AN AIRCRAFT

TECHNICAL FIELD

The invention relates to a method for optimised recovery of the energy dissipated in an aircraft and an architecture capable of implementing this method.

The invention applies to aircraft fitted with pressurisable cabins, particularly to commercial aircraft.

Conventionally, there are two types of energy sources in an aircraft that should be recovered, in order to control the consumption thereof: the air pressure of the passenger cabin, pressurised at altitude, and the heat dissipated in thermal chains (air conditioning, cabin air, exhaust gas).

By recovering these types of energy it is possible to minimise the dimensions, mass and consumption ultimately required for any one type of supply to non-propulsive energy consumers, i.e. pneumatic and electrical energy.

STATE OF THE ART

Pressurised air in the cabin is only available in flight, and the recovery of this energy is therefore limited to an altitude when the cabin pressurisation rate is sufficient, i.e. of the order of 3. Existing solutions involve a turbocharger or a recovery turbine, a source of electrical or pneumatic drive power, a load compressor and a heat exchanger.

For example, patent document U.S. Pat. No. 4,419,926 discloses the use of the compressor of a turbocharger to contribute towards supplying an additional stage of compressed air to the load compressor powering the ECS air conditioning packs (ECS being the abbreviation of "Environmental Control System"). The power or consumption of the electric motor driving the load compressor is then reduced. Moreover, the recovery turbine of the turbocharger, powered by the pressurised air leaving the cabin, cools the compressed air, which reduces the overall compression effort and therefore the consumption or size of the electric motor.

A variant discloses that just one recovery turbine can be used to drive the load compressor via an alternator or other electricity generation system. Heat exchange can then be provided between the air leaving the cabin and the air compressed by the load compressor so as to reduce the temperature of the flow leaving the compressor. This temperature reduction then permits a lower compression rate, without impairing the performance of the ECS, and therefore reduced consumption.

However, these types of architecture are limited to the energy recovery at altitude since, at low altitude or on the ground—when the pressurisation rate is inadequate or zero—there is no pressurised air leaving the cabin. On the ground, pneumatic cabin ventilation is in practice provided by a small turboshaft engine, including a gas generator connected to an exhaust nozzle for these gases, forming an auxiliary power unit (abbreviated as APU). The APU is also used for starting the main engines and for supplying electrical or pneumatic power to various consumers (pumps, load compressor, motors etc.). An APU of this type can be fitted on board the aircraft or connected on the ground to the various members to be powered. In some cases, APUs are sufficiently secure to operate during flight and, if necessary, to supplement, partially or even completely, the non-propulsive power supplied to the consumers by the main engines.

DISCLOSURE OF THE INVENTION

The aim of the invention is to permit the optimised recovery of energy, both at altitude and on the ground, using a single architecture. To this end, the invention aims to recover thermal energy from the exhaust, when the aeroplane is on the ground, so as to contribute to the compression of the ventilation air in the cabin, to the air conditioning and also, at altitude, to the compression of the pressurised conditioned air.

More specifically, the subject-matter of the present invention is a method for energy recovery in an aircraft fitted with a passenger cabin having an air flow regulated in terms of pressure and temperature using an ECS air conditioning system powered by a load compressor, and auxiliary power generation. The method consists in providing that:

when the aircraft is on the ground, known as "ground mode", the thermal energy dissipated by auxiliary power generation (energy otherwise lost) is recovered by heat exchange in its exhaust so as to power the cycle of a recovery turbocharger in order to produce mechanical energy in addition to auxiliary power generation;

when the aircraft is at altitude, known as "altitude mode", in which the cabin air is pressurised to a sufficient level, said turbocharger, driven at least partly by the air recovered as it leaves the cabin and then heated by heat exchange in the exhaust, produces compression in addition to that of the load compressor, so as to provide the compression rate required to power the ECS.

According to particular embodiments:

a second heat exchange can be performed between the air leaving the cabin and the compressed air entering the ECS system;

in altitude mode, the turbocharger forms a second air compression stage at the inlet of the ECS system;

while the aircraft is in altitude mode, the air compressed by the turbocharger and the compressed air leaving the cabin are combined upstream of the heat exchange produced at the exhaust, so as to increase the power of the auxiliary generation;

while the aircraft is in altitude mode, the air compression produced by turbocharging is switchable so as to be combined either at the inlet of the ECS system to form a second compression stage, or at the cabin air outlet, upstream of the heat exchange in the exhaust from the gas generator, so as to increase the power of the auxiliary generation.

The invention also relates to an architecture for energy recovery capable of implementing said method. Such an architecture includes an auxiliary power unit having an exhaust nozzle and incorporating a gas generator fitted with a shaft for transmitting power to a load compressor in order to supply compressed air via a supply duct to the ECS air conditioning system of the passenger cabin. Additionally, this architecture includes a recovery turbocharger connected, directly or via a transmission case or any other connection means, to the shaft of the APU. Said turbocharger includes a recovery turbine powered by air in a downstream branch of a conduit mounted on a heat exchanger fitted to the exhaust nozzle. Said conduit has a branch upstream of the exchanger, connected to channels linking the air outlets of the cabin and the compressor of the recovery turbocharger to said upstream branch.

According to preferred embodiments:

a second exchanger is mounted between the supply duct and the cabin outlet channel such that the air leaving the cabin and the compressed air entering the ECS system can transfer heat;

the means for switching the air circulation are arranged respectively between the supply duct of the ECS system and an inlet channel of the compressor of the recovery turbocharger, and between the outlet channel of said compressor and the upstream branch of the conduit mounted on the heat exchanger of the exhaust nozzle, such that the turbocharger is capable of forming a second air compression stage at the inlet of the ECS system;

the air from the compressor outlet channel and that from the cabin outlet channel have compression rates substantially balanced by adjusting the flow area of a variable-pitch distributor fitted to the recovery turbine;

the means for switching the air circulation are motorised valves controlled by a central management unit;

non-return valves can also advantageously be provided in channels, particularly in the air inlet channels and the channels linking to the cabin outlet, in order to prevent air from being driven back into these channels when they are made inactive in certain operating modes.

BRIEF DESCRIPTION OF THE FIGURES

Other aspects, characteristics and advantages of the invention will become apparent from the following non-restrictive description, relating to particular exemplary embodiments, with reference to the appended drawings, in which.

DETAILED DESCRIPTION OF EMBODIMENTS

In the present text, the terms "upstream" and "downstream" relate to locations dependent on the direction of air circulation.

Figure 1:
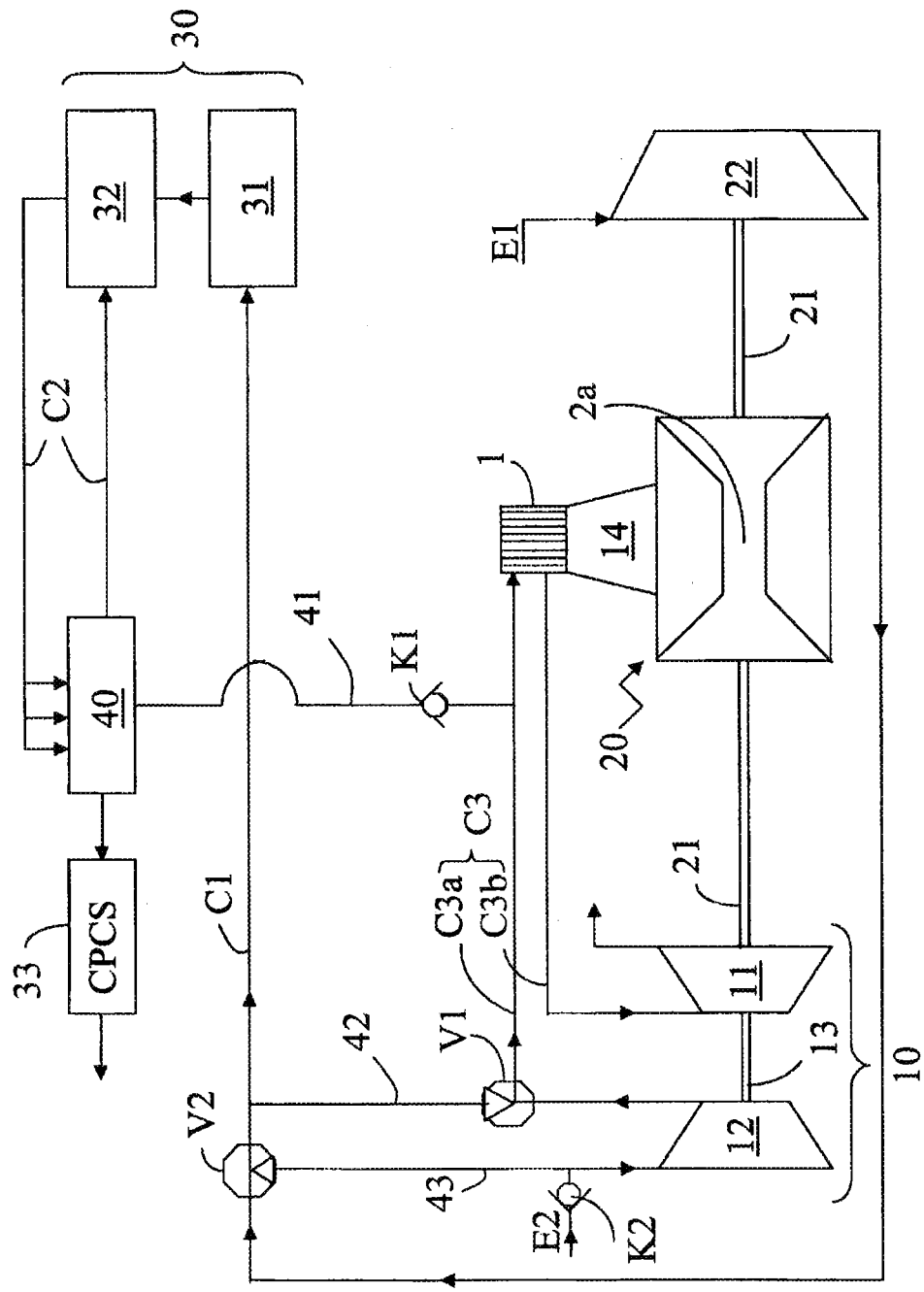
FIG. 1 shows the operating diagram of a first example of architecture for energy recovery according to the invention when the aircraft is on the ground.

With reference to the diagram in FIG. 1, the architecture for energy recovery in an aircraft includes a recovery turbocharger 10—composed essentially of a recovery turbine 11, a compressor 12, drive shaft 13 and a heat exchanger 1 placed in the gas exhaust nozzle 14 of the auxiliary power unit 20 (abbreviated to APU). The APU includes a turbine engine 2a for a transmission shaft 21. This turbine engine is conventionally composed of a compressor, a combustion chamber and a drive turbine.

This shaft 21 is connected, on the one hand, to the drive shaft 13 of the turbocharger 10—directly or via a connection means such as a transmission case (not shown) or equivalent—and, on the other hand, to a load compressor 22 for an external air inlet E1. Said compressor 22 powers the ECS air conditioning system 30 of the passenger cabin 40 by a compressed-air supply duct C1. Such an ECS system 30 includes a conditioning pack 31 that renews the air in the cabin compartments 40 by a recycling circuit C2 via a mixer 32. A passenger cabin pressure control system 33 (abbreviated to CPCS) regulates the pressure of the passenger cabin by metering the outlet airflow.

In this architecture, the air can circulate in a conduit C3 mounted on a heat exchanger 1 arranged in the nozzle 14 of the APU 20. The upstream branch C3a of the conduit C3 is linked to the channels 41 and 42, connected respectively to the outlets from the cabin 40 and the compressor 12 of the recovery turbocharger 10. A three-way valve V1 is mounted at the intersection of the channel 42 and the branch C3a. The downstream branch C3b of the conduit C3 is connected to the recovery turbine 11.

Moreover, the channel 42 links the outlet of the compressor 12 to the supply duct C1, while a channel 43 links the duct C1 to the inlet of said compressor 12 via a valve V2 positioned at the duct/channel intersection. An external air inlet channel E2 for this compressor 12 is connected to the channel 43. The channels 42 and 43 linking to the compressor 12 of the turbocharger 10 are thus mounted on the duct C1 downstream of the load compressor 22.

When the aircraft is on the ground, the air in the cabin 40 is not pressurised. The APU 20 is started up to allow ventilation of the cabin 40, to start up the engines and to power pneumatic and electrical energy consumers via appropriate transmission cases.

Energy is then recovered, in "ground" mode, by air circulation in the heat exchanger 1 of the nozzle 14 of the APU 20, to drive the recovery turbocharger 10. The values V2 and V1 are regulated in rotation so as to, respectively, cut off the supply of the channel 43, such that the compressor 12 is powered solely by the external air inlet E2, and so that, as it leaves said compressor 12, the compressed air circulates from the channel 42 to the branch C3a of the conduit C3. The compressed air, heated in the exchanger 1, is then fed towards the recovery turbine 11 of the turbocharger 10 via the downstream branch C3b.

In these circumstances, the recovery turbine 11 contributes, through its shaft 13, to driving the APU 20, which will be able to consume less fuel while producing the same power, particularly to drive the load compressor 22. Advantageously, a non-return valve K1 is provided in the channel 41 in order to prevent the pressurised air circulating in the upstream branch C3a from being driven back into the channel 41 linking to the cabin 40.

Figure 2:
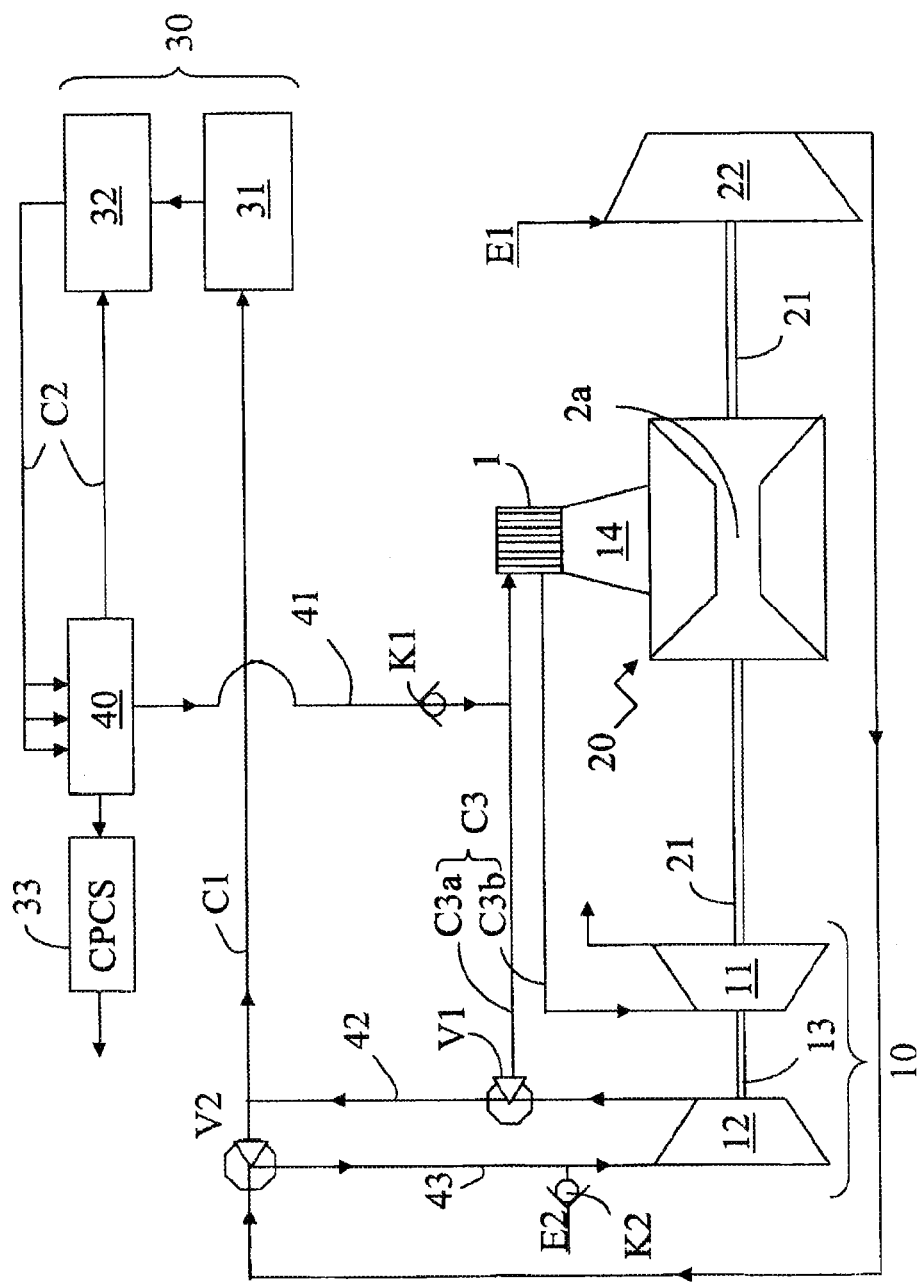
FIG. 2 shows the operating diagram of this example of architecture when the aircraft is at a sufficient altitude for the cabin to be pressurised, when just the air from the cabin outlet drives the recovery turbine.

When the aircraft is at a sufficient altitude, for example upwards of 3000 or 4000 m, the cabin 40 is sufficiently pressurised for the architecture to switch to "altitude" mode, as illustrated in FIG. 2. To change from one mode to the other, the valves V1 and V2 are advantageously motorised and a central management unit (not shown) is programmed to allow mode switching: this unit sends electrical signals corresponding to the predetermined setting configurations of the valves at the channel intersections, to comply with operation in the two modes and with changes from one mode to the other.

In "altitude" mode, air under pressure is sent, as it leaves the cabin 40, to the channel 41 giving access to the upstream branch C3a of the heat exchanger 1. Energy recovery in this mode thus results from cabin pressurisation. As in the "ground" mode, the recovery turbine 11 is then driven by the circulation of warmed, pressurised air coming from the exchanger 1 via the downstream channel C3b. The turbine then contributes, through its shaft 13, to driving the APU 20, which will thus be able to consume less fuel while producing the same power, particularly to drive the load compressor 22.

At the same time, the valves V1 and V2 are set so that the compressor 12 acts as a second compression stage on the duct C1 supplying compressed air, downstream of the load compressor 22 acting as the first stage of compression. To do this, the valves V2 and V1 are controlled in terms of rotation by the unit so that, respectively, the duct C1 communicates with the channel 43 linked to the inlet of the compressor 12 and the channel 42 communicates with the duct C1. Advantageously, a non-return valve K2 is provided in the air inlet channel E2 in order to prevent the pressurised air circulating in the channel 43 from being driven back into the channel E2.

Figure 3:
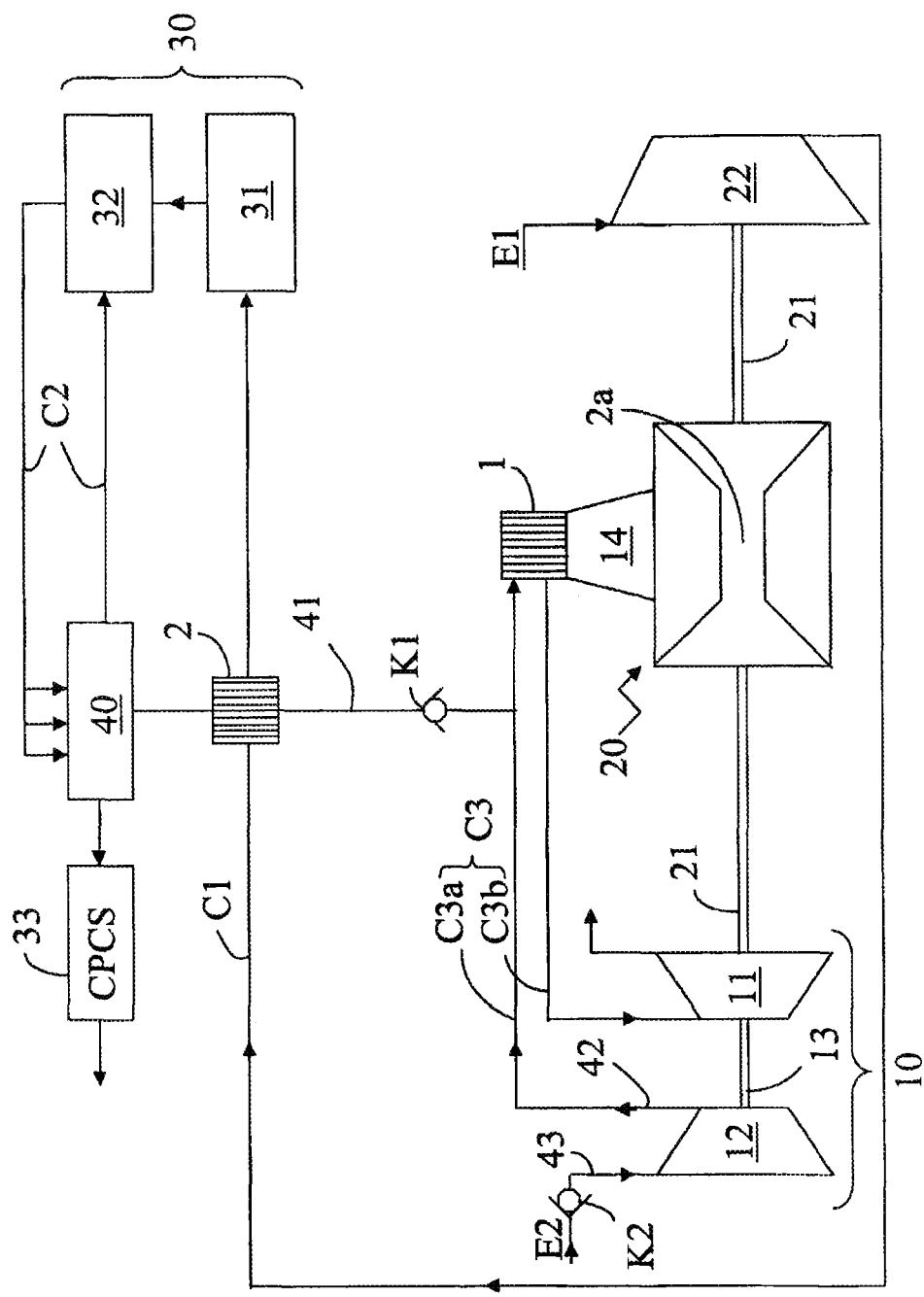
FIG. 3 shows the operating diagram of a variant of the preceding example of architecture, including an exchanger between the cabin outlet and the duct linking to the ECS conditioning system, the aircraft being on the ground.
Figure 4:
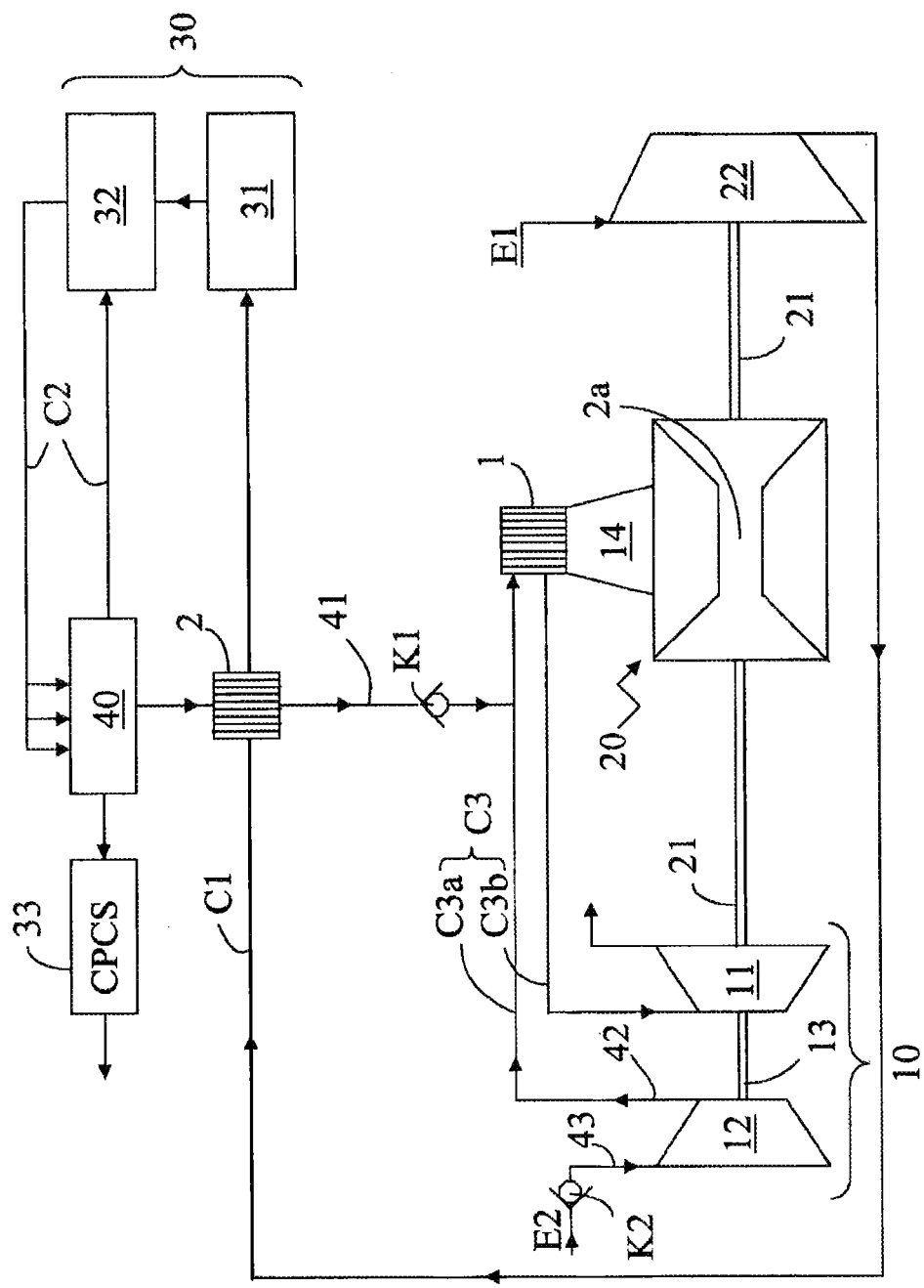
FIG. 4 shows the operating diagram of the example in FIG. 3 when, the aircraft being at a sufficient altitude, the air leaving the cabin and the air leaving the compressor together drive the recovery turbine.

According to a variant architecture, illustrated by the diagrams in FIGS. 3 and 4, dual energy recovery is achieved in "altitude" mode by taking advantage of both the pressurised air leaving the cabin 40 and the air following compression by the turbocharger 10.

With reference to FIG. 3, the variant architecture also uses the same members as the previous architecture, with the same reference signs. The inlet/outlet channels 42 and 43 of the compressor 12 of the recovery turbocharger 10 are no longer linked to the supply duct C1: the channel 43 is powered only by the external air inlet E2 and the channel 42 is extended by the upstream branch C3a of the heat exchanger 1.

Moreover, another heat exchanger 2 is provided between the supply duct C1—at the outlet of the load compressor 12—and the channel 41 at the outlet of the cabin 40. This exchanger 2 will be used in "altitude" mode (FIG. 4).

In "ground" mode (FIG. 3), energy recovery is similar to that which takes place with the first architecture (see FIG. 1), by circulation of the air in the heat exchanger 1 of the nozzle 14 of the APU 20, to drive the recovery turbine 11 then, partially, the APU and the load compressor 22. This architecture has the advantage of not requiring valves.

In "altitude" mode as illustrated by FIG. 4, the pressurised air from the channel 41 as it leaves the cabin 40 is heated first by passing through the heat exchanger 2. This exchanger can also lower the temperature of the air in the duct C1, so as to compensate—in terms of the operation of the ECS—for the lower compression produced by this architecture in the supply duct C1 compared with the previous version, which had two compression stages. Indeed, the compressor 12 here no longer performs the function of a second-stage of compression for the air in the duct C1.

The invention is not limited to the examples described and illustrated.

For example, it is possible to switch, in "altitude" mode, from the first architecture to the variant architecture. In other words, change—automatically by means of the management unit or manually by the pilot—from simple recovery from the outlet of the cabin (FIG. 2) to dual recovery, combining the outlet channel 41 from the cabin and the outlet channel 42 from the compressor 12 (FIG. 4).

To do this, the valves V1 and V2 of the first version (FIGS. 1 and 2) are controlled so as to be able to switch, reversibly and when the aircraft is at altitude, from the positions defined in "ground" mode to the positions defined in "altitude" mode and vice versa. The presence of the exchanger 2 can advantageously be retained so as to be compatible with the lowest pressure level in the duct C1 when the valves are in the positions defined in "ground" mode.

The invention claimed is:

1. A method to recover energy in an aircraft including a passenger cabin including an air flow regulated in terms of pressure and temperature using an environmental control and air conditioning system (ECS) powered by a load compressor, and auxiliary power generation, the method comprising:
   when the aircraft is in a ground mode, recovering thermal energy dissipated by the auxiliary power generation by heat exchange in an exhaust of the auxiliary power generation to power a cycle of a recovery turbocharger to produce mechanical energy in addition to the auxiliary power generation; and
   when the aircraft is in an altitude mode, in which cabin air is pressurized to a sufficient level, producing compression with the recovery turbocharger, driven at least partly by the cabin air recovered as the cabin air leaves the cabin and then heated by heat exchange in the exhaust, in addition to that of the load compressor, to provide compression rate required to power the ECS.

2. The method according to claim 1, wherein a second heat exchange is performed between relatively colder air leaving the cabin and relatively warmer compressed air entering the ECS.

3. The method according to claim 1, wherein the recovery turbocharger, in the altitude mode, forms a second air compression stage at an inlet of the ECS.

4. The method according to claim 1, wherein, while the aircraft is in the altitude mode, air compressed by the recovery turbocharger and compressed air leaving the cabin are combined upstream of the heat exchange produced at the exhaust, to increase power of the auxiliary power generation.

5. The method according to claim 1, wherein, while the aircraft is in the altitude mode, air compression produced by the recovery turbocharger is switchable to be combined either at an inlet of the ECS to form a second compression stage, or at a cabin air outlet, upstream of the heat exchange in the exhaust from a gas generator, to increase power of the auxiliary power generation.

6. An architecture to recover energy implementing the method according to claim 1, comprising:
   an auxiliary power unit (APU) including an exhaust nozzle and incorporating a gas generator including a shaft to transmit power to a load compressor to supply, via a supply duct, compressed air to the ECS of the passenger cabin;
   wherein the recovery turbocharger is connected to the shaft of the APU, the recovery turbocharger including a recovery turbine powered by air circulating in a downstream branch of a conduit mounted on a heat exchanger fitted to the exhaust nozzle, and the conduit including an upstream branch upstream of the heat exchanger, and the upstream branch connected to a cabin outlet channel linking an air outlet of the passenger cabin to the upstream branch and connected to an outlet channel of the compressor of the recovery turbocharger linking a compressor of the recovery turbocharger to the upstream branch.

7. The architecture according to claim 6, wherein a second exchanger is mounted between the supply duct and the cabin outlet channel such that air leaving the passenger cabin and compressed air entering the ECS can transfer heat.

8. The architecture according to claim 6, wherein a mechanism to switch an air circulation is arranged respectively between the supply duct to the ECS and an inlet channel of the compressor of the recovery turbocharger, and between the outlet channel of the compressor of the recovery turbocharger and the upstream branch of the conduit mounted on the heat exchanger of the exhaust nozzle, such that the recovery turbocharger is configured to form a second air compression stage at an inlet of the ECS.

9. The architecture according to claim 6, wherein the air from the outlet channel of the compressor and from the cabin outlet channel include compression rates substantially balanced by adjusting a flow area of a variable-pitch distributor fitted to the recovery turbine.

10. The architecture according to claim 6, wherein a mechanism to switch the air circulation includes motorized valves controlled by a central management unit.

* * * * *